United States Patent
Sheffield

(10) Patent No.: US 9,858,007 B2
(45) Date of Patent: Jan. 2, 2018

(54) DECOUPLING HOST AND DEVICE ADDRESS MAPS FOR A PERIPHERAL COMPONENT INTERCONNECT EXPRESS CONTROLLER

(71) Applicant: AVAGO TECHNOLOGIES GENERAL IP (SINGAPORE) PTE. LTD., Singapore (SG)

(72) Inventor: Robert L. Sheffield, Longmont, CO (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 575 days.

(21) Appl. No.: 14/289,329

(22) Filed: May 28, 2014

(65) Prior Publication Data

US 2015/0134855 A1     May 14, 2015

Related U.S. Application Data

(60) Provisional application No. 61/902,826, filed on Nov. 12, 2013.

(51) Int. Cl.
*G06F 3/06* (2006.01)

(52) U.S. Cl.
CPC .......... *G06F 3/0638* (2013.01); *G06F 3/0604* (2013.01); *G06F 3/0656* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 6,389,513 B1* | 5/2002 | Closson | ............... | G06F 12/0813 707/999.008 |
| 6,832,295 B1* | 12/2004 | Stonecypher | ....... | G06F 12/1036 711/118 |
| 8,122,177 B1 | 2/2012 | Puranik | | |
| 8,489,795 B2 | 7/2013 | Suganuma | | |
| 8,819,335 B1* | 8/2014 | Salessi | ................ | G06F 12/0246 711/103 |
| 2006/0195620 A1 | 8/2006 | Arndt et al. | | |
| 2012/0311217 A1* | 12/2012 | Bubb | .................... | G06F 13/385 710/305 |
| 2014/0164640 A1* | 6/2014 | Ye | ........................... | H04L 47/12 709/235 |

* cited by examiner

*Primary Examiner* — Idriss N Alrobaye
*Assistant Examiner* — Dayton Lewis-Taylor
(74) *Attorney, Agent, or Firm* — Sheridan Ross P.C.

(57) ABSTRACT

A controller includes a virtual memory mapped to device-side Peripheral component interconnect express address space includes virtual buffers allocation for each data transfer. Each virtual buffer is associated with a scatter/gather list entry in a host memory. The controller executes direct transfers between Peripheral component interconnect express devices and host memory without introducing address mapping dependencies between the host and device domains.

20 Claims, 3 Drawing Sheets

DECOUPLING HOST AND DEVICE ADDRESS MAPS FOR A PERIPHERAL COMPONENT INTERCONNECT EXPRESS CONTROLLER

PRIORITY

The present application claims the benefit under 35 U.S.C. §119(e) of U.S. Provisional Application Ser. No. 61/902,826, filed Nov. 12, 2013, which is incorporated herein by reference.

FIELD OF THE INVENTION

The present invention is directed generally toward peripheral component interconnect storage devices used in a RAID controller, and more particularly toward virtual memory used in a RAID controller with peripheral component interconnect devices.

BACKGROUND OF THE INVENTION

Device-side peripheral component interconnect express memory transactions originated by the PCIe device cannot be unconditionally mapped to host memory due to the necessity of using subtractive decoding to determine which device accesses need to be routed to the host for direct transfers, versus which accesses are routed to RAID internal memory. If all input/output transfers were buffered in the RAID controller through double data rate memory, subtractive decoding would not be necessary, and the device-facing address maps could be decoupled from the host-facing peripheral component interconnect express address map. However, this would introduce serious degradation in performance.

Consequently, it would be advantageous if an apparatus existed that is suitable for mapping addresses in a host domain to addresses in a device domain.

SUMMARY OF THE INVENTION

Accordingly, the present invention is directed to a novel method and apparatus for mapping addresses in a host domain to addresses in a device domain.

In one embodiment of the present invention, a virtual memory mapped to device-side Peripheral component interconnect express address space includes allocation of virtual buffers for each data transfer. Each virtual buffer is associated with a scatter/gather list that references data buffers in host memory. A controller executes direct transfers between Peripheral component interconnect express devices and host memory without introducing fixed address mapping dependencies between the host and device domains.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
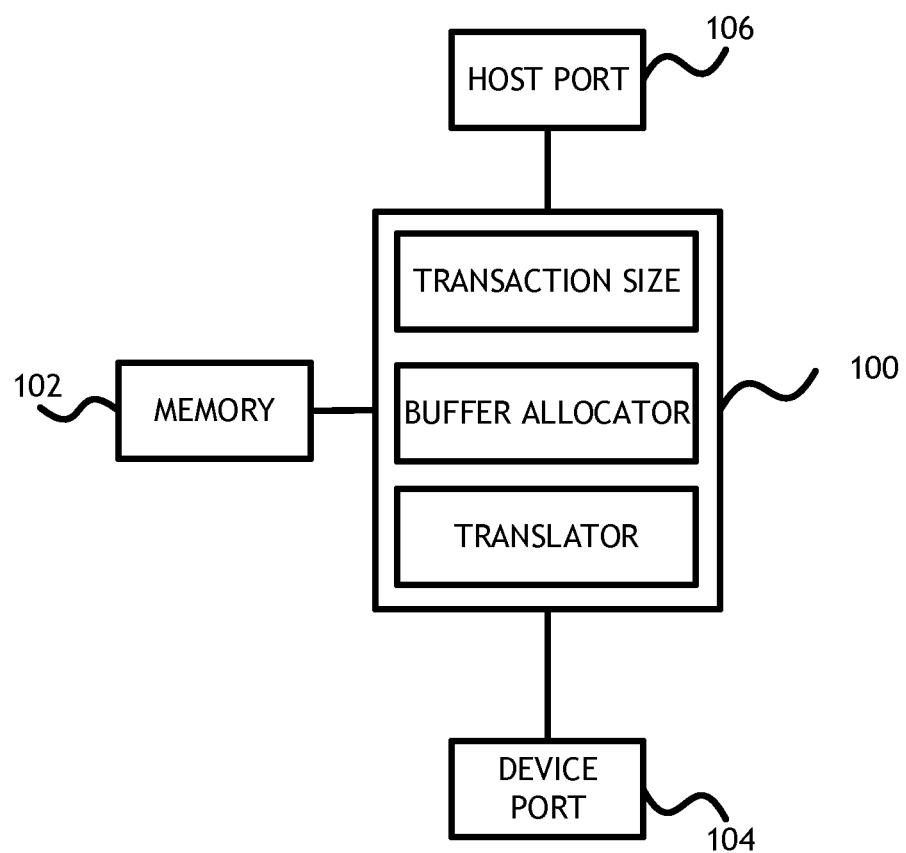
FIG. 1 shows a block diagram of a bridge device suitable for implementing embodiments of the present invention.

Referring to FIG. 1, a block diagram of a bridge device suitable for implementing embodiments of the present invention is shown. In at least one embodiment, a bridge device suitable for implementing embodiments of the present invention includes one or more hardware engines 100, memory 102 connected to the one or more hardware engines 100, one or more device ports 104 connected to the one or more hardware engines 100 and one or more host ports 106 connected to the one or more hardware engines 100.

A host device connected to a host port 106 sends commands such as input/output commands to store data to or retrieve data from a peripheral component interconnect express device connected to a device port 104. Host devices and peripheral component interconnect express devices each define a memory address domain such that a valid memory address known to a host device do not, in general, correspond to a valid memory address known to the peripheral component interconnect express device. The memory 102 is configured to store a scatter/gather list mapping areas of memory on the host device. A buffer allocation engine in the one or more hardware engines 100 is configured to allocate a virtual memory block and one or more virtual buffers in the virtual memory block. Each of the virtual buffers is associated with one or more real buffers referenced by a scatter/gather list. A translator engine in the one or more hardware engines 100 then translates addresses from a device domain to a host domain with reference to the scatter/gather list, the host buffer list and the virtual memory block.

A person skilled in the art may appreciate that although some embodiments of the present invention include dedicated hardware engines 100; a computer apparatus having a programmable processor may also be utilized in other embodiments to accomplish the same processes.

Figure 2:
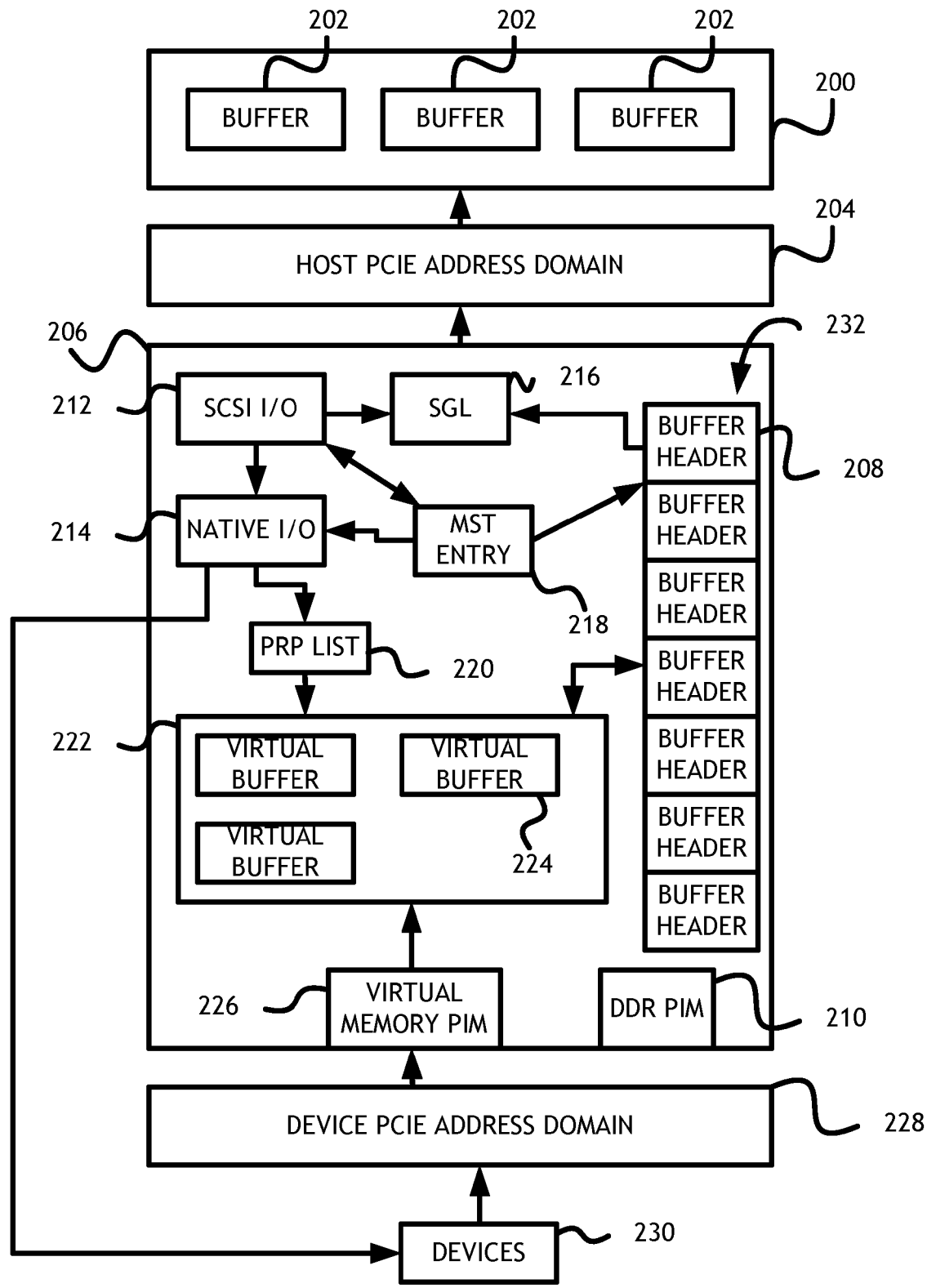
FIG. 2 shows a block diagram of a memory structure for mapping addresses in a RAID controller.

Referring to FIG. 2, a block diagram of a memory structure for mapping addresses in a RAID controller is shown. The controller translates addresses from a device domain 228 to a host domain 204 such that data transfers can be effectively routed between one or more hosts 200, and host memory buffers 202 within those hosts 200, and devices 230 connected to the controller.

In at least one embodiment, a controller direct path 206 includes a virtual memory 222. The virtual memory 222 is mapped to a device address map. During each data transfer, the controller allocates a virtual buffer 224 in the virtual memory 222 sufficient to buffer the entire data transfer. The controller links the allocated virtual buffer 224 to a host mapped scatter/gather list 216 such that the controller can translate memory addresses from the device domain 228 to the host domain 204. In at least one embodiment, the controller 206 maintains a buffer header list 232 of organized buffer headers 208. Each buffer header 208 is associated with a virtual buffer 224 in the virtual memory 222. In at least one embodiment, the buffer header list 232 is organized as a hash table; such hash table may have a hash function corresponding to the virtual buffer 224 address. An organized buffer header list 232 facilitates fast translation between the host mapped scatter/gather list 216 and the one or more virtual buffers 224.

In at least one embodiment, the controller 206 receives a small computer system interface input/output 212. In one embodiment the controller 206 translates the small computer system interface input/output 212 with reference to the host mapped scatter/gather list 216. In one embodiment the controller 206 translates the small computer system interface input/output 212 into a native input/output message 214 for transmission to a device 230. Such translation may include reference to a physical region page list 220. In one embodiment, the controller provides a physical region page list 220 that describes a virtual buffer 224 along with the Native I/O sent to a peripheral connect interface express device 230.

When a PCIe device originates a data transfer request with a reference mapping to a virtual buffer 224, the translator uses the virtual buffer 224 address to find the buffer header 208 and the corresponding scatter/gather list 216 and the corresponding real host memory buffers 202. Data transfers associated with the request are routed directly to and from the identified host memory buffers 202 by modifying the address information in the transaction layer data packets according to the translation expressed in the virtual buffer to host buffer mapping.

In at least one embodiment the controller 206 utilizes a MID state table 218 to correlate small computer system interface input/outputs, native input/output messages 214 and buffer headers 208 in the buffer header list 232. In one embodiment, the controller 206 may communicate with devices 230 through a double data rate port interface module 210 when accessing memory addresses according to the device address domain 228, or through a virtual memory port interface module 226 when accessing memory addresses according to virtual buffers 222.

Device-facing peripheral component interconnect express address map is thereby decoupled from the host-facing address map.

Figure 3:
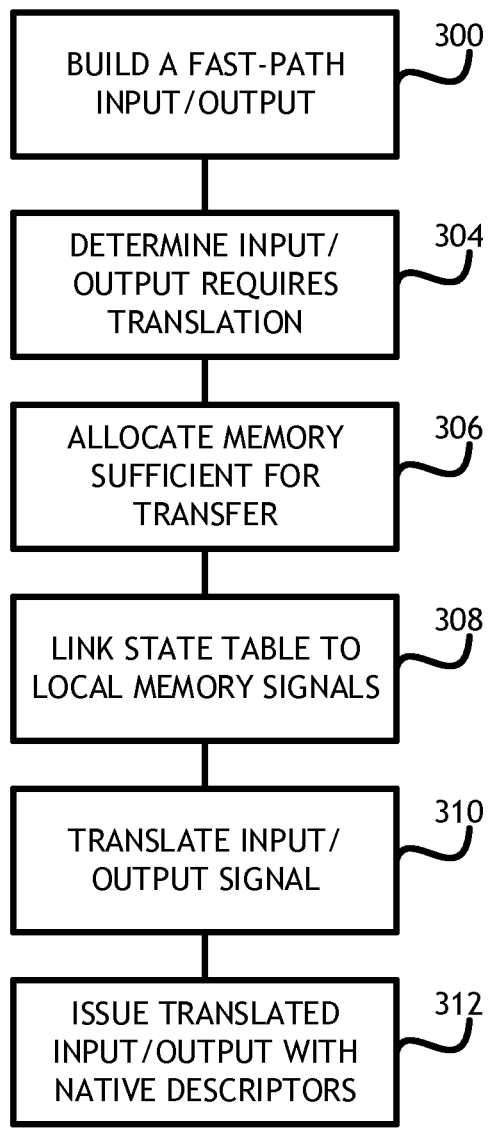
FIG. 3 shows a flowchart of a method for mapping memory addresses between a host and a device.

Referring to FIG. 3, a flowchart of a method for mapping memory addresses between a host and a device. Small computer system interface input/outputs received by a controller are processed to build 300 a fast-path input/output with reference to a scatter/gather list. In one embodiment the controller includes an input/output adapter that recognizes an input/output as a fast-path input/output to a peripheral component interconnect express device. In one embodiment, the peripheral component interconnect express device is a non-volatile memory express device. The controller determines 304 that an input/output requires translation to a non-volatile memory express command frame; the scatter/gather list may also be translated to physical region page element in a physical region page list that refers to a virtual buffer in place of the host memory identified by the host scatter/gather list.

The input/output adapter allocates 306 a virtual buffer with enough capacity to contain the entire transfer from a virtual buffer pool. In one embodiment the input/output adapter links 308 a MID-state table entry to a virtual buffer header in a buffer header list, and links the virtual buffer header back to the original scatter/gather list pulled into local memory.

The input/output adapter then translates 310 the small computer system interface input/output into a native peripheral component interconnect express input/output frame and builds a native peripheral component interconnect express-format transfer specification with a physical region descriptor table describing a contiguous transfer starting at a base address of the virtual buffer, and including as many descriptor entries as required to fulfill the specified transfer size.

The input/output adapter then issues 312 the translated input/output along with native transfer descriptors to a peripheral component interconnect express device.

When a peripheral component interconnect express device initiates a transfer, a controller claims the transaction on the device-facing peripheral component interconnect express domain and uses the address to locate a virtual buffer header; and in turn locates the corresponding scatter/gather list entry from the virtual buffer header. The controller also determines an offset based on the offset of the peripheral component interconnect express address within the virtual buffer.

The input/output adapter routes the transaction to a host device, applying a translation as required based upon the translation between the virtual buffer device-side peripheral component interconnect express address and a host-peripheral component interconnect express domain address derived from the scatter/gather list. The translation process is repeated for each transfer request originated by the PCIe device until all transfers associated with the input/output operation are complete. When the device returns a completion status message corresponding to the input/output, the input/output adapter frees the native input/output frame, the physical region descriptor table and the virtual buffer header. Those resources are then available for future transfers.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A controller apparatus comprising:
   one or more hardware engines;
   memory connected to the one or more hardware engines;
   one or more host ports connected to the one or more hardware engines, configured to connect to one or more host devices; and
   one or more device ports connected to the one or more hardware engines, configured to connect to one or more peripheral component interconnect express devices,
   wherein the one or more hardware engines are configured to:
      determine a transaction size;
      allocate a buffer header;
      allocate a virtual buffer, associated with one or more memory addresses in the peripheral component interconnect device, in a virtual memory according to the transaction size;
      associate the virtual buffer with the buffer header;
      associate the virtual buffer with a scatter/gather list element, associated with a memory address in a host; and
      link the buffer header and the scatter/gather list element in a state table entry.

2. The controller apparatus of claim 1, wherein the one or more hardware engines are further configured to place the buffer header in a buffer header list.

3. The controller apparatus of claim 2, wherein the one or more hardware engines are further configured to organize the buffer header list according to a hash function.

4. The storage device of claim 2, wherein the buffer header list is organized as a hash table.

5. The controller apparatus of claim 1, wherein the one or more hardware engines are further configured to translate a SCSI transaction into a PCIe device transaction.

6. The controller apparatus of claim 5, wherein the one or more hardware engines are further configured to issue the translated transaction to the peripheral component interface device.

7. The controller apparatus of claim 1, wherein the one or more hardware engines are further configured to pull a SCSI input/output and a scatter/gather list into a local memory.

8. A method for mapping peripheral component interconnect device addresses to host addresses, comprising:
   determining a transaction size;
   allocating a buffer header;
   allocating a virtual buffer in a virtual memory according to the transaction size;
   associating the virtual buffer with the buffer header;
   associating the virtual buffer with a scatter/gather list element, wherein:
      the virtual buffer is associated with one or more virtual memory addresses provided to the peripheral component interconnect device; and
      the scatter/gather list entry is associated with a memory address in the host; and
   linking the buffer header and scatter/gather list element in a state table entry.

9. The method of claim 8, further comprising placing the buffer header in a buffer header list.

10. The method of claim 9, further comprising organizing the buffer header list according to a hash function.

11. The method of claim 8, further comprising translating a host transaction into a PCIe device transaction.

12. The method of claim 11, further comprising issuing the translated fast path transaction to the peripheral component interface device.

13. The method of claim 8, further comprising pulling a SCSI input/output and a scatter/gather list into a local memory.

14. A redundant array of independent disks data storage device comprising:
   a plurality of peripheral component interconnect data storage devices; and
   a controller configured to control access between the plurality of peripheral component interconnect data storage devices and one or more hosts, comprising:
      one or more hardware engines;
      memory connected to the one or more hardware engines;
      one or more host ports connected to the one or more hardware engines, configured to connect to one or more host devices; and
      one or more device ports connected to the one or more hardware engines and connected to the one or more peripheral component interconnect express devices, wherein:
         the one or more hardware engines are configured to:
            determine a transaction size;
            allocate a buffer header;
            allocate a virtual buffer, associated with one or more memory addresses in the peripheral component interconnect device, in a virtual memory according to the transaction size;
            associate the virtual buffer with the buffer header;
            associate the virtual buffer with a scatter/gather list element, associated with a memory address in a host; and
            link the buffer header and scatter/gather list entry in a state table.

15. The storage device of claim 14, wherein the one or more hardware engines are further configured to place the buffer header in a buffer header list.

16. The storage device of claim 15, wherein the one or more hardware engines are further configured to organize the buffer header list according to a hash function.

17. The storage device of claim 15, wherein the buffer header list is organized as a hash table.

18. The storage device of claim 14, wherein the one or more hardware engines are further configured to translate a host-originated transaction into a PCIe device transaction.

19. The storage device of claim 18, wherein the one or more hardware engines are further configured to issue the translated transaction to the peripheral component interface device.

20. The storage device of claim 14, wherein the one or more hardware engines are further configured to pull SCSI input/output and a scatter/gather list into a local memory.

* * * * *